(12) United States Patent
Suzuki et al.

(10) Patent No.: US 12,278,911 B2
(45) Date of Patent: Apr. 15, 2025

(54) CERTIFICATE ISSUANCE SUPPORT SYSTEM, CERTIFICATE ISSUANCE SUPPORT METHOD AND PROGRAM

(71) Applicant: NIPPON TELEGRAPH AND TELEPHONE CORPORATION, Tokyo (JP)

(72) Inventors: Ryohei Suzuki, Tokyo (JP); Tetsuya Okuda, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 205 days.

(21) Appl. No.: 18/250,639

(22) PCT Filed: Dec. 10, 2020

(86) PCT No.: PCT/JP2020/046126
§ 371 (c)(1),
(2) Date: Apr. 26, 2023

(87) PCT Pub. No.: WO2022/123745
PCT Pub. Date: Jun. 16, 2022

(65) Prior Publication Data
US 2023/0403164 A1 Dec. 14, 2023

(51) Int. Cl.
*H04L 9/32* (2006.01)
(52) U.S. Cl.
CPC .......... *H04L 9/3263* (2013.01); *H04L 9/3247* (2013.01)

(58) Field of Classification Search
CPC .................. H04L 9/3247; H04L 9/3263
See application file for complete search history.

(56) References Cited

U.S. PATENT DOCUMENTS

| 11,316,703 B2 * | 4/2022 | Hou | G06F 9/547 |
| 12,101,417 B1 * | 9/2024 | Slaughter | H04L 9/321 |

(Continued)

OTHER PUBLICATIONS https://www.digicert.com/difference-between-dv-ov-and-ev-ssl-certificates (Year: 2021).*

(Continued)

*Primary Examiner* — Kostas J Katsikis
(74) *Attorney, Agent, or Firm* — IPUSA, PLLC

(57) ABSTRACT

A certificate issuance support system includes a certificate application device in a first organization for applying to an authentication station for issuance of an OV certificate; and an existence assurance device in a second organization for guaranteeing the existence of the first organization. The existence assurance device imparts a first signature to first information for guaranteeing the existence of the first organization in response to a request from a terminal used by a member of the first organization, transmits the first information imparted with the first signature is to the certificate application device, and verifies a second signature generated by the certificate application device and imparted to second information for guaranteeing affiliation of the member with the authentication station. The certificate application device transmits the first information with the first signature and the second information with the second signature to the authentication station to receive the OV certificate.

7 Claims, 8 Drawing Sheets

(56) References Cited

U.S. PATENT DOCUMENTS

| | | | | |
|---|---|---|---|---|
| 2015/0341342 A1* | 11/2015 | Klieman | ............ | H04L 63/0823 |
| | | | | 713/158 |
| 2019/0036908 A1* | 1/2019 | Liu | ........................ | H04L 9/14 |
| 2019/0319809 A1* | 10/2019 | Rowley | ................ | H04L 9/3268 |
| 2023/0060447 A1* | 3/2023 | Jayakumar | ............... | H04L 9/50 |

OTHER PUBLICATIONS

Automatic Certificate Management Environment (RFC8555), [online], the Internet, Mar. 2019, <URL: https://tools.ietf.org/html/rfc8555>.
Koichi Miyakawa, "eKYC and future development as identify verification means," JNSA Press No. 48, pp. 2-8, Jan. 2020, [online], the Internet<URL: https://www.jnsa.org/jnsapress/vol48/2_kikou.pdf>.

* cited by examiner

CERTIFICATE ISSUANCE SUPPORT SYSTEM, CERTIFICATE ISSUANCE SUPPORT METHOD AND PROGRAM

TECHNICAL FIELD

The present invention relates to a certificate issuance support system, a certificate issuance support method, and program.

BACKGROUND ART

An electronic certificate indicating an identity of a website is used to electronically certify the identity by a trusted third party. Such electronic certificates include a domain validation (DV) certificate, an organization validation (OV) certificate, and the like depending on the degree of identity verification. A DV certificate is a certificate issued by an applicant confirming the possession of a domain. An OV certificate is a certificate issued by confirming the existence of a certificate application organization and whether an applicant belongs to the organization in addition to the possession of a domain by the applicant.

As a protocol used for issuing a DV certificate, automated certificate management environment (ACME) is known (NPL 1). By using the ACME, a DV certificate can be automatically issued.

On the other hand, as a technique for electronically guaranteeing the identity of an individual, an electronic Know Your Customer (eKYC) is known (NPL 2).

CITATION LIST

Non Patent Literature

[NPL 1] Automatic Certificate Management Environment (RFC8555), [online], the Internet<URL: https://tools.ietf.org/html/rfc8555>

[NPL 2] Koichi MIYAKAWA, "eKYC and future development as identify verification means," JNSA Press No. 48, pp. 2-8, 2020/1, [online], the Internet<URL: https://www.jnsa.org/jnsapress/vol48/2_kikou.pdf>

SUMMARY OF INVENTION

Technical Problem

However, since confirmation of existence of an organization is not considered, the ACME cannot be applied to issuance of an OV certificate as it is. Conventionally, upon issuing an OV certificate, it has been manually confirmed whether an organization to which it is to be issued is a person or an applicant belongs to the organization, for example, by using a document or a telephone.

In addition, the identity that can be guaranteed by an eKYC is an identity of an individual, and existence confirmation of an organization is not considered.

Therefore, it is difficult to automatically issue an OV certificate in the prior art.

In view of the above-described points, an object of the present invention is to support automatic issuance of OV certificates.

Solution to Problem

In order to solve the above problem, in a certificate issuance support system including a certificate application device in a first organization for applying to an authentication station for issuance of an OV certificate, and an existence assurance device included in a second organization for guaranteeing the existence of the first organization, the existence assurance device includes an assignment unit that imparts a first electronic signature to first information for guaranteeing the existence of the first organization in response to a request from a terminal used by a member of the first organization, a transmission unit that transmits the first information to which the first electronic signature is imparted to the certificate application device, and a verification unit that verifies a second electronic signature, which is generated by the certificate application device and is imparted to second information for guaranteeing affiliation of the member of the first organization in cooperation with the authentication station, and the certificate application device transmits the first information to which the first electronic signature is imparted and the second information to which the second electronic signature is imparted to the authentication station to receive the OV certificate issuance.

Advantageous Effects of Invention

Automatic issuance of an OV certificate can be supported.

DESCRIPTION OF EMBODIMENTS

In the present embodiment, by expanding the automatic certificate management environment (ACME) protocol, not only the conventional domain possession confirmation but also an electronic issuance procedure of an OV certificate including a flow of confirming "existence of an application organization" and "affiliation of an applicant with an organization" is disclosed. Note that an organization validation (OV) certificate is an electronic certificate issued by confirming whether an organization to be issued with the certificate exists, or whether the applicant belongs to the organization to be issued with the certificate, in addition to the applicant possessing a domain at the time of issuance of the certificate.

In addition, an eKYC method for guaranteeing that a member belongs to an organization to allow electronic processing of such confirmation is disclosed.

In the present embodiment, a specific organization applying for the issuance of the OV certificate is called a "corporation." In addition, a specific person who is an applicant for issuance of a certificate is called an "employee" among the members of the organization (corporation).

Figure 1:
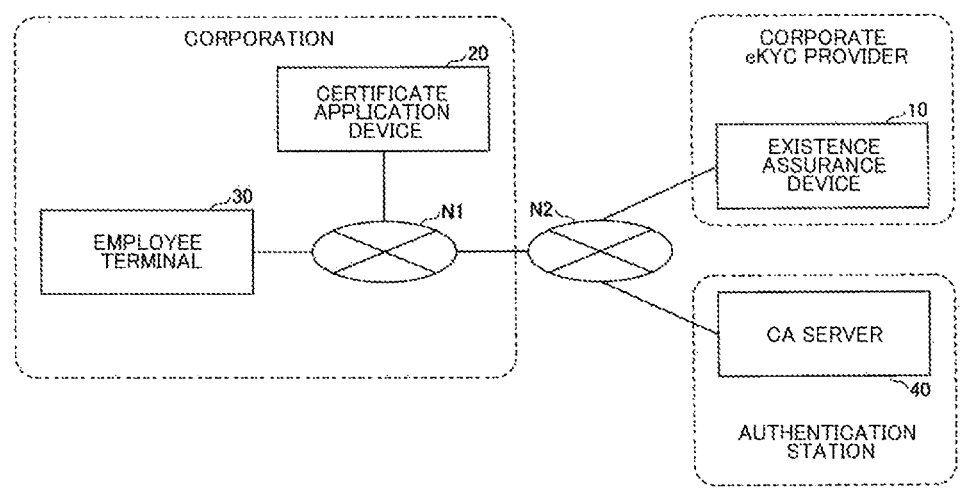
FIG. 1 is a diagram illustrating a configuration example of a certificate issuance support system in a first embodiment.

Hereinafter, an embodiment of the present invention will be described with reference to the accompanying drawings. FIG. 1 is a diagram illustrating a configuration example of a certificate issuance support system in a first embodiment. In FIG. 1, each region surrounded by a broken line indicates an organization. In the present embodiment, computers of three organizations, a corporation, a corporate eKYC provider and an authentication station, are linked through a network.

The corporation is an example of an organization to which an OV certificate is issued (issuance applicant). The corporation is in a state capable of authenticating the employee. For example, the corporation can issue an ID/PW or the like to each employee and authenticate the employee in the corporation. In FIG. 1, the corporation includes a certificate application device 20 and one or more employee terminals 30.

The employee terminal 30 is a terminal such as a personal computer (PC) used by an employee who is in charge of certificate issuance application work. The employee terminal 30 is connected to the certificate application device 20 via a network N1 in a corporation, and connected to an existence assurance device 10 and a CA server 40 via the network N1 and a network N2 such as the Internet.

The certificate application device 20 authenticates the employee and functions as an extended ACME client in a case where the employee has authority (hereinafter simply referred to as "authority") to request information for guaranteeing the existence of a corporation from a corporate eKYC provider (hereinafter referred to as the "existence assurance information"). The certificate application device 20 functions as an extended ACME client to make the existence assurance device 10 guarantee the existence of a corporation, and request the CA server 40 to issue an OV certificate after assuring the existence assurance device 10 the existence of an employee. The existence of an employee means that the employee surely belongs to a corporation. The certificate application device 20 is connected to the existence assurance device 10 and the CA server 40 via the network N1 and the network N2.

The corporate eKYC provider is an organization whose existence is assumed in the present embodiment, and that guarantees the existence of a corporation (claims of the corporation). The corporate eKYC provider functions as a general PKI authentication base, (hereinafter referred to as "corporation PKI"), and the corporate PKI allows corporations to use electronic signatures. Since the corporate eKYC provider is a PKI authentication base, it also functions as a certificate authority (CA) of a public key certificate for authentication. Note that the authentication station is a CA (CA that issues OV certificates) for guaranteeing corporate web servers, whereas the corporate eKYC provider functions as the CA as an authentication base. That is, the roles of both are different.

The corporate eKYC provider may be implemented by an administration or a third party organization. That is, the administration or the like may electronically assure the existence of the corporation, or a third party organization may exist which provides information for confirming the identity of the corporation. Since the identity of the corporation can be guaranteed in either case, a guarantor of an identity of a corporation (existence or identity) can be either the administration or the third party.

In FIG. 1, the corporate eKYC provider has the existence assurance device 10. The existence assurance device 10 is one or more computers for electronically implementing the function of the corporate eKYC provider. For example, a provider server guarantees the existence of a corporation and confirms the existence of the employee (that the employee belongs to the corporation).

The authentication station is a conventional authentication station. In FIG. 1, the authentication station has the CA server 40. In the present embodiment, the CA server 40 issues an organization validation (OV) certificate to the corporation according to the ACME.

Figure 2:
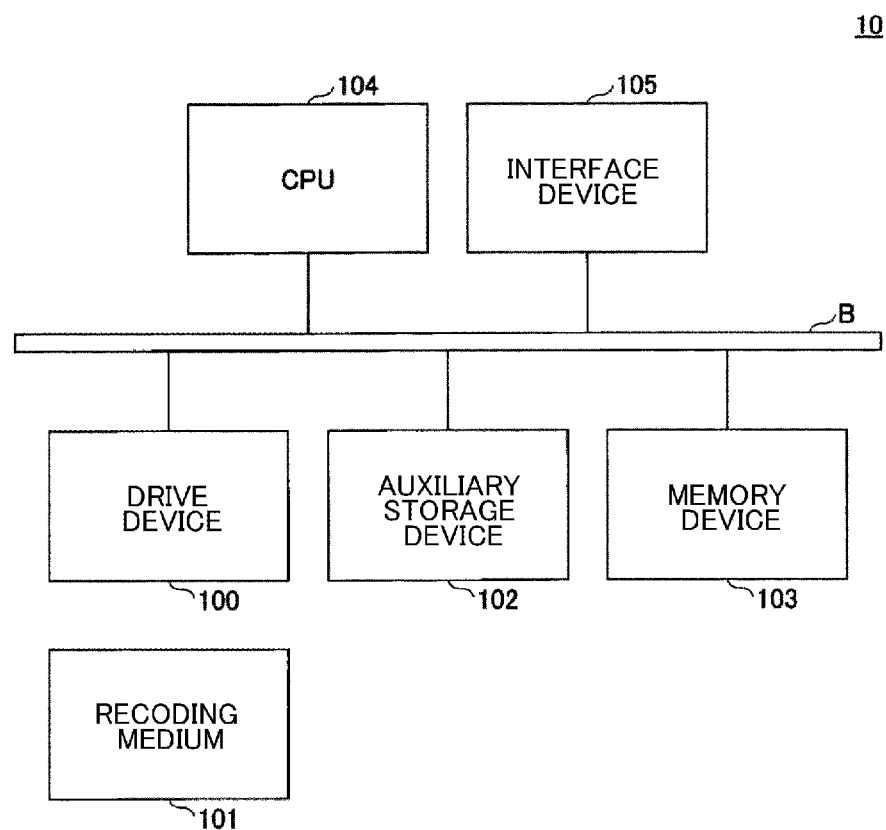
FIG. 2 is a diagram illustrating a hardware configuration example of an existence assurance device 10 in the first embodiment.

FIG. 2 is a diagram illustrating a hardware configuration example of the existence assurance device 10 in the first embodiment. The existence assurance device 10 in FIG. 3 includes a drive device 100, an auxiliary storage device 102, a memory device 103, a CPU 104, an interface device 105, and the like, which are connected to each other by a bus B.

A program that implements processing in the existence assurance device 10 is provided by a recording medium 101 such as a CD-ROM. When the recording medium 101 storing the program is set in the drive device 100, the program is installed from the recording medium 101 to the auxiliary storage device 102 via the drive device 100. However, the program does not necessarily have to be installed from the recording medium 101 and may be downloaded from another computer via a network. The auxiliary storage device 102 stores the installed program as well as necessary files, data, and the like.

The memory device 103 reads the program from the auxiliary storage device 102 and stores the program when an instruction for starting the program is issued. The CPU 104 implements functions related to the existence assurance device 10 according to the program stored in the memory device 103. The interface device 105 is used as an interface for connection to a network.

Figure 3:
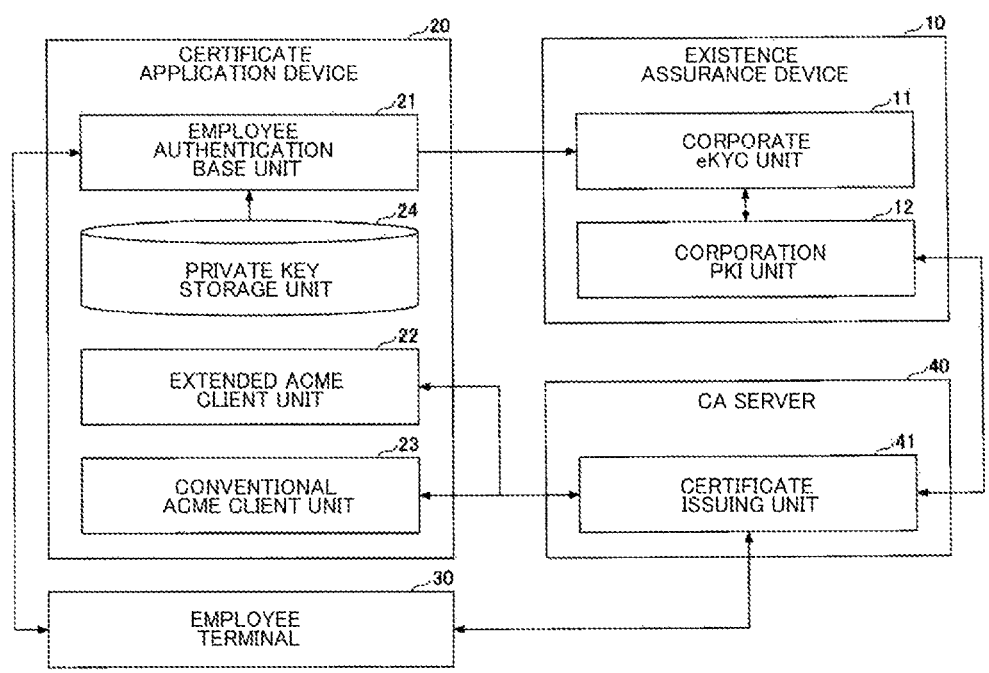
FIG. 3 is a diagram illustrating a functional configuration example of the certificate issuance support system in the first embodiment.

FIG. 3 is a diagram illustrating a functional configuration example of the certificate issuance support system in the first embodiment. In FIG. 3, the certificate application device 20 includes an employee authentication base unit 21, an extended ACME client unit 22, and a conventional ACME client unit 23. Each of these units is implemented by processing of causing a CPU of the certificate application device 20 to execute one or more programs installed in the certificate application device 20. However, these units may be implemented by different computers. The certificate application device 20 also uses a private key storage unit 24. The private key storage unit 24 can be implemented using, for example, an auxiliary storage device of the certificate application device 20 or a storage device connectable to the certificate application device 20 via a network.

The employee authentication base unit 21 authenticates the employee and confirms presence/absence of the authority of the employee.

The extended ACME client unit 22 and the conventional ACME client unit 23 are ACME clients in the present embodiment. The ACME client is software that interprets ACME-based exchanges with the CA server 40 that supports an automatic certificate management environment (ACME), which is an automatic certificate issuance protocol, and applies for certificate issuance.

The extended ACME client unit 22 executes a flow to be extended relative to the ACME protocol in the present embodiment.

The conventional ACME client unit 23 interacts with the CA server 40 by a conventional ACME protocol.

The private key storage unit 24 stores a private key (hereinafter referred to as "corporate private key") that is used to impart a signature that can be verified by a corporate PKI unit 12 of the existence assurance device 10. The corporate private key is provided from the corporate PKI unit 12.

The existence assurance device 10 includes a corporate eKYC unit 11 and the corporate PKI unit 12. Each of these units is implemented by processing of causing the CPU 104 to execute one or more programs installed in the existence assurance device 10. However, these units may be implemented by different computers.

The corporate eKYC unit 11 provides information (existence assurance information) for guaranteeing the existence of the corporation to the corporation. The corporate eKYC unit 11 makes the corporate PKI unit 12 execute the application of an electronic signature by a corporate eKYC provider of information for guaranteeing of the existence of the corporation.

The corporate PKI unit 12 provides a general PKI to the corporation. For example, the corporate PKI unit 12 distributes a public key certificate and a route certificate of a corporate eKYC provider to the corporation.

The CA server 40 has a certificate issuing unit 41. The certificate issuing unit 41 is implemented through processing that one or more programs installed in the CA server 40 cause the CPU of the CA server 40 to execute.

The certificate issuing unit 41 issues an electronic certificate (OV certificate in the present embodiment) based on ACME which is an automatic certificate issuing protocol.

Figure 4:
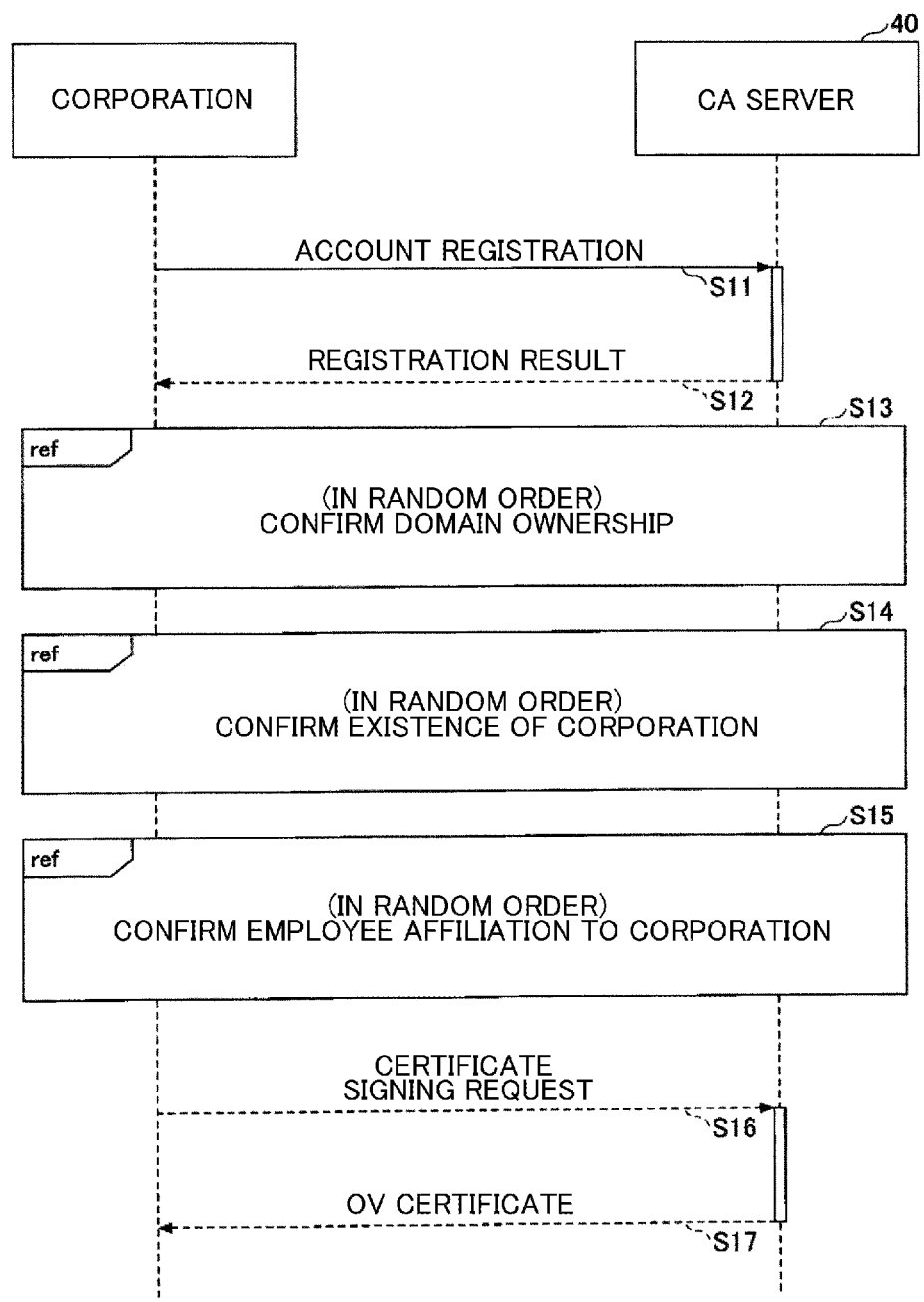
FIG. 4 is a sequence diagram illustrating an example of a processing procedure which is executed in the certificate issuance support system.

A processing procedure executed in the certificate issuance support system will be described below. FIG. 4 is a sequence diagram illustrating an example of a processing procedure which is executed in the certificate issuance support system. In FIG. 4, the axis under "corporation" represents a set of the employee terminal 30, the conventional ACME client unit 23, the extended ACME client unit 22, and the employee authentication base unit 21.

In addition, in FIG. 4, steps S11 to S13, S16, and S17 are steps based on conventional ACME. Therefore, the extended ACME client unit 22 does not participate in these steps. On the other hand, steps S14 and S15 are steps of extension to the ACME. Therefore, the conventional ACME client unit 23 does not participate in the steps S14 and S15.

In a step S11, the corporation registers an account for the corporation in the CA server 40. The CA server 40 returns a registration result of the account (S12). When registering the account, the public key of the corporation (public key corresponding to a corporate private key (hereinafter referred to as "corporate public key")) is also registered in the CA server 40. Thus, the CA server 40 can authenticate the corporation in the following steps. That is, in subsequent steps, the CA server 40 authenticates the corporation for each request from the corporation to the CA server 40, as in conventional ACME. The account registration may be performed once.

The subsequent steps S13 to S15 may be executed in any order, and these steps may be executed asynchronously (at any desired timing).

In the step S13, confirmation processing is executed between the corporation and the CA server 40 to confirm that the corporation possesses the domain (the domain related to the application for the certificate) according to the ACME.

In the step S14, confirmation processing of existence of the corporation is performed by cooperation of the corporation, the CA server 40, and the existence assurance device 10.

In the step S15, the corporation, the CA server 40, and the existence assurance device 10 cooperate with each other to confirm whether the employee belongs to the corporation (existence of the employee).

The CA server 40 records information indicating what confirmation is completed for the corporation in association with the account of the corporation every time the steps S13 to S15 are executed.

That is, when the step S13 is normally terminated, the CA server 40 records information indicating that confirmation that the corporation possesses the domain is completed. When the step S14 is normally terminated, the CA server 40 records information indicating that confirmation of existence of the corporation is completed. When the step S15 is normally terminated, the CA server 40 records information indicating that confirmation of the employee belonging to the corporation is completed. Since the corporation is authenticated in each step of the steps S13 to S15, the CA server 40 can identify which corporation is confirmed.

At an arbitrary timing after the execution of the steps S13 to S15, the corporation (for example, the conventional ACME client unit 23) transmits a certificate signing request (CSR) to the CA server 40 (S16). Also in the certificate signing request, the CA server 40 authenticates the corporation.

In response to the certificate signing request, the CA server 40 confirms which confirmation of the steps S13 to S15 has been completed for a corporation of the transmission source of the certificate signing request (corporation authenticated for the certificate signing request). When all the confirmation is completed, the CA server 40 generates an OV certificate for the corporation, and returns the OV certificate to the corporation (S17).

Figure 5:
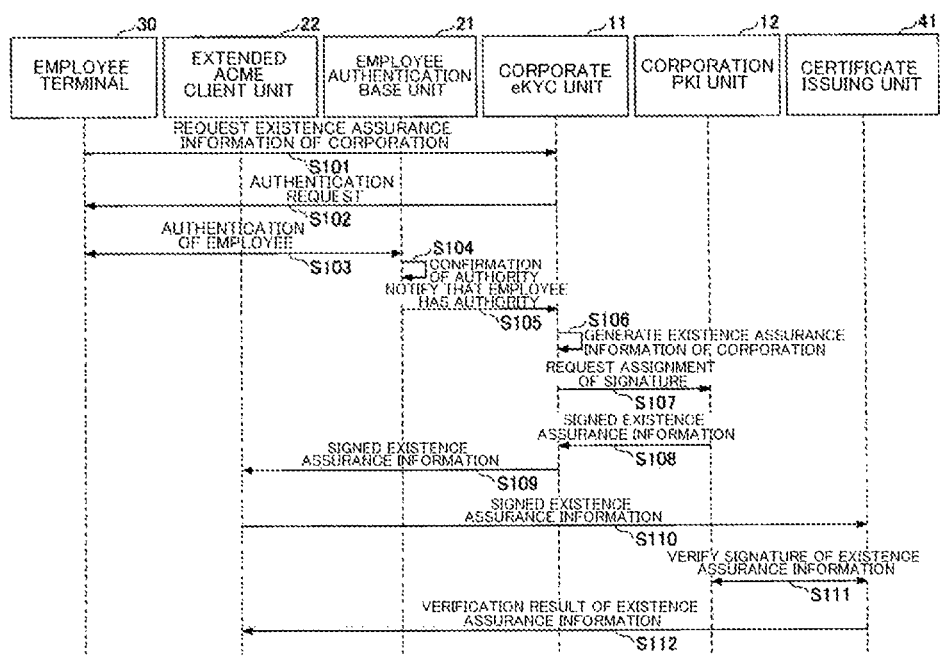
FIG. 5 is a sequence diagram for illustrating an example of a processing procedure for processing of confirming of the existence of a corporation in the first embodiment.

Next, the step S14 will be described in detail. FIG. 5 is a sequence diagram for illustrating an example of a processing procedure for processing of confirming the existence of a corporation in the first embodiment.

In a step S101, the employee terminal 30 makes a request for existence assurance information of the corporation to the corporate eKYC unit 11 in response to an input by the employee (acquisition instruction of existence assurance information of the corporation). The corporate eKYC unit 11 transmits an authentication request to the employee terminal 30 in response to a request from the employee terminal 30 (S102). The reason why the authentication request is transmitted from the corporate eKYC unit 11 to the employee terminal 30 is that the employee authentication base unit 21 capable of authenticating the employee is located in the corporation (certificate application device 20), and the employee cannot be authenticated by the existence assurance device 10. Then, the corporate eKYC unit 11 transmits the authentication request to the employee terminal 30 so that the authentication request is redirected to the employee authentication base unit 21.

In response to the authentication request, the employee terminal 30 executes the authentication of the employee in cooperation with the employee authentication base unit 21 of the certificate application device 20 (S103). For example, the employee terminal 30 displays a screen for inputting an ID and a password of the employee for such authentication. The employee terminal 30 transmits the ID and password input to the screen to the employee authentication base unit 21. The employee authentication base unit 21 compares the ID and password with correct ID and password stored in advance in the certificate application device 20, and when both of them match, the employee authentication is successful. The authentication is authentication for obtaining the existence assurance information of the corporation (that is, for using the corporate eKYC unit 11).

In a case where the employee is successfully authenticated, the employee authentication base unit 21 confirms whether the employee has authority of "making a request for the existence assurance information of the corporation to the corporate eKYC unit 11" (S104). For example, information indicating the presence or absence of authority for each member of a corporation is stored in the certificate application device 20, and the employee authentication base unit 21 refers to the information to confirm whether the employee has the authority.

In a case where the employee has the authority, the employee authentication base unit 21 notifies the corporate eKYC unit 11 that the employee has the authority (S105). Such notification may be executed in any procedure. For example, the corporate eKYC unit 11 may transmit a token that is data indicating that an employee has authority to the employee terminal 30, and the employee terminal 30 may transmit the token to the corporate eKYC unit 11.

In this case, when the corporate eKYC unit 11 inquires the employee authentication base unit 21 about the presence or absence of the authority with the token, the employee authentication base unit 21 may verify the token and respond to the corporate eKYC unit 11 about the presence of the authority when the token is valid.

The corporate eKYC unit 11 generates the existence assurance information of the corporation according to the notification that the employee has the authority (S106). For example, the corporate eKYC unit 11 generates the following existence assurance information in JavaScript (registered trademark) Object Notation (JSON) format.

{"Iss": "https://eKyc.exampe.com," "aud":"xxxx," "name": "xxxx Corp," . . . }

In the above-mentioned existence assurance information, "xxxx" is, for example, a character string indicating the name of a corporation.

Subsequently, the corporate eKYC unit 11 transmits the existence assurance information to the corporate PKI unit 12, and requests the corporate PKI unit 12 to impart a signature (electronic signature) to the existence assurance information (S107). The corporate PKI unit 12 uses the corporation PKI to sign the existence assurance information by a private key of a corporate eKYC provider (imparts a signature to the existence assurance information), and responds with the signed existence assurance information to the corporate eKYC unit 11 (S108). The CA server 40 can confirm the authenticity of the existence assurance information by the signature.

Subsequently, the corporate eKYC unit 11 transmits the signed existence assurance information to the extended ACME client unit 22 of the certificate application device 20 (S109). However, the existence assurance information may be transmitted to the extended ACME client unit 22 via the employee terminal 30. In this case, the corporate eKYC unit 11 transmits the existence assurance information to the employee terminal 30 as a response to the step S101. The employee terminal 30 transmits the existence assurance information to the extended ACME client unit 22.

Then, the extended ACME client unit 22 transmits the existence assurance information to the certificate issuing unit 41 of the CA server 40 (S110). When receiving the existence assurance information, the certificate issuing unit 41 causes the corporate PKI unit 12 to verify the signature imparted to the existence assurance information (S111). When it is confirmed by the corporation PKI unit 12 that the signature is correct, the certificate issuing unit 41 transmits a verification result of the existence assurance information to the extended ACME client unit 22 (S112). The certificate issuing unit 41 records the existence assurance information in the CA server 40 as information indicating completion of confirmation of existence of the corporation.

In FIG. 4, the existence assurance information is transmitted to the certificate issuing unit 41 by the extended ACME client unit 22, but when the existence assurance information finally reaches the certificate issuing unit 41, any procedure may be employed. The CA and the corporate eKYC provider may directly cooperate to acquire information. In this case, a technology based on OAuth 2.0 may be used.

Figure 6:
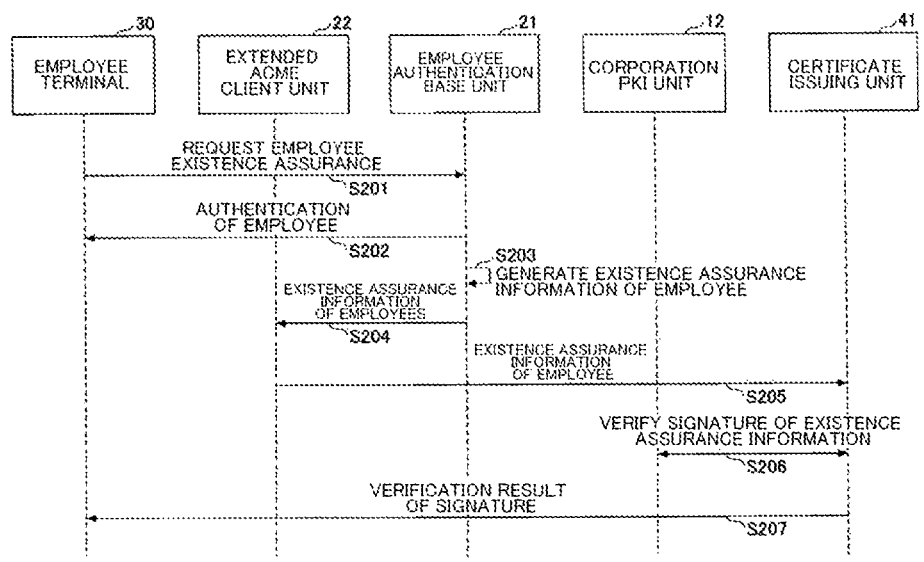
FIG. 6 is a sequence diagram for illustrating an example of a processing procedure for processing of confirming of affiliation of an employee to the corporation.

Next, details of a step S15 illustrated in FIG. 4 will be described. FIG. 6 is a sequence diagram for illustrating an example of a processing procedure for processing of confirming affiliation of an employee to the corporation.

In a step S201, the employee terminal 30 makes a request for the existence assurance of the employee to the employee authentication base unit 21 in response to an input by the employee (a request instruction of the existence assurance of the employee). The employee authentication base unit 21 executes the authentication of the employee in cooperation with the employee terminal 30 (S202). By the authentication, it is confirmed whether the employee is the person himself or herself.

When the authentication of the employee is successful, the employee authentication base unit 21 generates the existence assurance information of the employee (S203). For example, the employee authentication base unit 21 generates the following existence assurance information by the JSON format.

{"affiliation":"xxx Corp.","name":"yyy", . . . }

In the above-described existence assurance information, "xxx" is, for example, a character string indicating the name of a corporation, "yyy" is a character string indicating the name of the employee.

The employee authentication base unit 21 makes a signature for the generated existence assurance information by using the corporate private key (imparts a signature). A signature is imparted to the existence assurance information using the corporation private key, so that the existence (affiliation) of employees is guaranteed by the corporation. Also, the certificate issuing unit 41 can confirm the authenticity of the existence assurance information by the signature. The signature may be performed by an external service. For example, a management function and a signature function of the corporation private key may be performed by an external service.

Subsequently, the employee authentication base unit 21 transmits the signed existence assurance information to the extended ACME client unit 22 (S204). However, the existence assurance information may be transmitted to the extended ACME client unit 22 via the employee terminal 30. In this case, the employee authentication base unit 21 transmits the existence assurance information to the employee terminal 30 as a response to the step S201. The employee terminal 30 transmits the existence assurance information to the extended ACME client unit 22.

Subsequently, the extended ACME client unit 22 transmits the existence assurance information to the certificate issuing unit 41 of the CA server 40 (S205). When receiving the existence assurance information, the certificate issuing unit 41 verifies the signature imparted to the existence assurance information in cooperation with the corporate PKI unit 12 (S206). In other words, the corporate PKI unit 12 verifies the signature imparted to the existence assurance information in cooperation with the certificate issuing unit 41. For example, the certificate issuing unit 41 receives distribution of the corporation public key from the corporate PKI unit 12 and verifies the signature. However, the distribution of the corporation public key may be performed by other methods (or at other timings). Alternatively, the corporate PKI unit 12 may verify the signature imparted to the existence assurance information and transmit the result to the certificate issuing unit 41.

When it is confirmed that the signature is correct, the certificate issuing unit 41 transmits a verification result of the signature to the employee terminal 30 (S207). The certificate issuing unit 41 records the existence assurance information in the CA server 40 as information indicating that confirmation of the employee belonging to the corporation is completed.

As described above, according to the first embodiment, by expanding the ACME, it is possible to electronically confirm the existence of the corporation, and to implement an eKYC (the electronic identity confirmation (of the individual)) for making an assurance of the affiliation of an employee (applicant) to a corporation. As a result, the application of the OV certificate can be electronically executed, and the automatic issue of the OV certificate can be supported.

Next, a second embodiment will be described. In the second embodiment, points different from those of the first embodiment will be described. Points which are not mentioned particularly in the second embodiment may be similar to those of the first embodiment.

In a second embodiment, a modification example of the processing procedure of the step S14 of FIG. 4 (that is, the processing procedure of FIG. 5) is shown.

Figure 7:
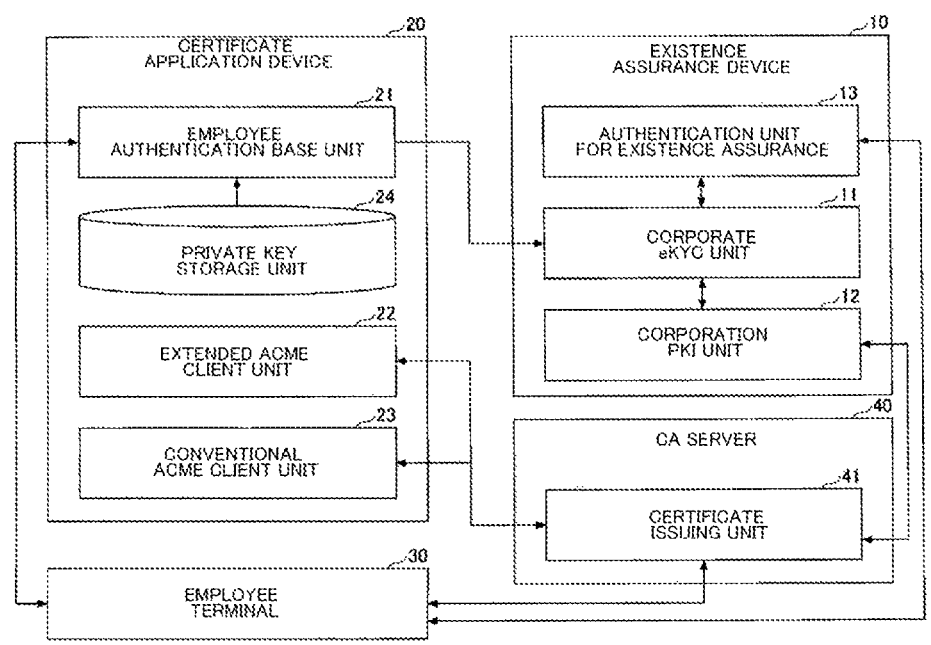
FIG. 7 is a diagram illustrating a functional configuration example of a certificate issuance support system in a second embodiment.

FIG. 7 is a diagram illustrating a functional configuration example of a certificate issuance support system in the second embodiment. In FIG. 7, the existence assurance device 10 further includes an authentication unit for existence assurance 13. The authentication unit for existence assurance 13 is implemented by causing the CPU 104 to execute one or more programs installed in the existence assurance device 10.

The authentication unit for existence assurance 13 authenticates an employee for existence assurance of a corporation. In order to enable such authentication, in the second embodiment, the account of the employee who is permitted to request the existence assurance is registered in advance in the existence assurance device 10. For registration of such an account, a system for Cross-Domain identity management (SCIM) may be used.

Figure 8:
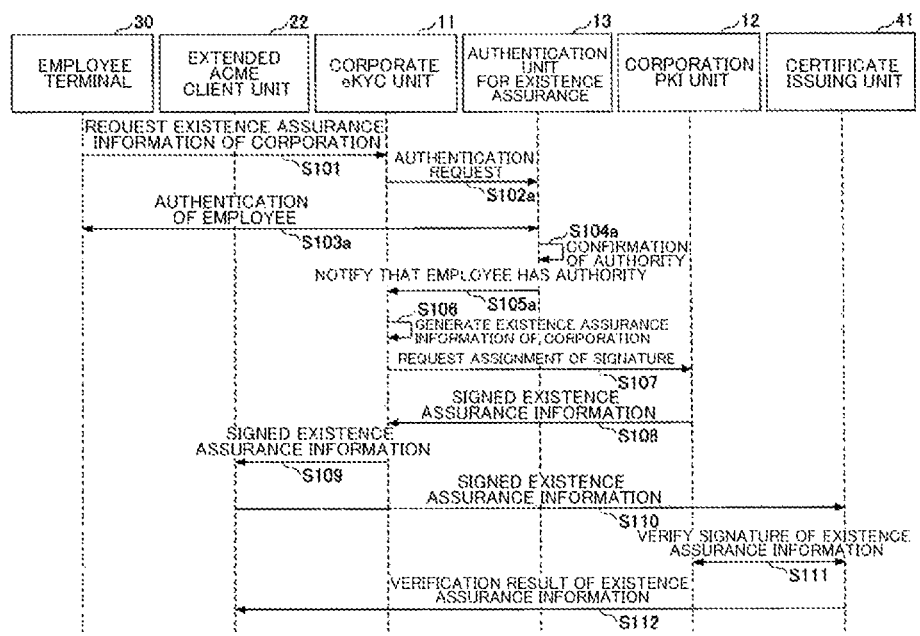
FIG. 8 is a sequence diagram for illustrating an example of a processing procedure for processing of confirming of an existence of a corporation in the second embodiment.

FIG. 8 is a sequence diagram for illustrating an example of a processing procedure for processing of confirming an existence of a corporation in the second embodiment. In FIG. 8, the same steps as those in FIG. 5 are designated by the same step numbers, and their description will not be repeated.

In FIG. 8, steps the S102 to S105 of FIG. 5 are replaced with the steps S102a to S105a.

In the step S102a, the corporate eKYC unit 11 makes a request for the authentication of the employee to the authentication unit for existence assurance 13. In response to the request for the authentication, the authentication unit for existence assurance 13 executes the authentication of the employee in cooperation with the employee terminal 30 (S103a). For example, the authentication unit for existence assurance 13 transmits a Web page for displaying a screen for inputting the ID and password of the employee for such authentication to the employee terminal 30. The employee terminal 30 displays the screen based on the Web page. The employee terminal 30 transmits the ID and the password input to the screen to the authentication unit for existence assurance 13. The authentication unit for existence assurance 13 compares the ID and password with an account (a correct ID and password) registered in advance, and when both match, the authentication of the employee is successful. The authentication unit for existence assurance 13 may authenticate the employee in cooperation with the employee authentication base unit 21.

In a case where the authentication of the employee is successful, the authentication unit for existence assurance 13 confirms whether the employee has authority of "making a request for existence assurance information of the corporation to the corporate eKYC unit 11" (S104a). For example, information indicating a person having such authority is stored in the existence assurance device 10, and the authentication unit for existence assurance 13 refers to the information to confirm whether the employee has the authority.

In a case where the employee has the authority, the authentication unit for existence assurance 13 notifies the corporate eKYC unit 11 that the employee has the authority (S105a). The subsequent steps are the same as in FIG. 5.

In the second embodiment, since the authentication function of the employee exists in the existence assurance device 10, the existence assurance device 10 can directly provide the authentication function to the employee. Also, the notification of the presence of the authority to the employee can be performed by cooperation in the existence assurance device 10.

In the case of the first embodiment, the existence assurance device 10 does not need to know which employee is the requester (applicant) of the existence assurance (corporate eKYC providers only know what an authorized employee has requested, and do not know which employee is requesting). On the other hand, in the second embodiment, the corporate eKYC provider can know who the applicant is an employee.

Note that in the above embodiments, a corporation is an example of a first organization. The corporate eKYC provider is an example of a second organization. The corporate PKI unit 12 is an example of an assignment unit and a verification unit. The corporate eKYC unit 11 is an example of a transmission unit. The existence assurance information of the corporation is an example of first information. The existence assurance information of the employee is an example of second information.

Although the embodiments of the present invention have been described in detail above, the present invention is not limited to these particular embodiments, and various modifications and changes are possible within the scope of the gist of the present invention described in the claims.

REFERENCE SIGNS LIST

10 Existence assurance device
11 Corporate eKYC unit
12 Corporation PKI unit
13 Authentication unit for existence assurance
20 Certificate application device
21 Employee authentication base unit
22 Extended ACME client unit 23 Conventional ACME client unit
24 Private key storage unit
30 Employee terminal
40 CA server
41 Certificate issuing unit
100 Drive device
101 Recording medium
102 Auxiliary storage device
103 Memory device
104 CPU
105 Interface device
B Bus

The invention claimed is:

1. A certificate issuance support system comprising:
a certificate application device in a first organization for applying to an authentication station for issuance of an OV certificate, the certificate application device including a memory and a processor; and
an existence assurance device included in a second organization for guaranteeing the existence of the first organization, the existence assurance device including a memory and a processor,
wherein the processor of the existence assurance device is configured to
impart a first electronic signature to first information for guaranteeing the existence of the first organization in response to a request from a terminal used by a member of the first organization,
transmit the first information to which the first electronic signature is imparted to the certificate application device, and
verify a second electronic signature, which is generated by the certificate application device and is imparted to second information for guaranteeing affiliation of the member of the first organization in cooperation with the authentication station, and
wherein the processor of the certificate application device transmits the first information to which the first electronic signature is imparted and the second information to which the second electronic signature is imparted to the authentication station to receive the OV certificate issuance.

2. The certificate issuance support system according to claim 1, wherein the processor of the existence assurance device imparts the first electronic signature to the first information in a case where the member is authenticated.

3. The certificate issuance support system according to claim 1, wherein the processor of the certificate application device executes transmission of the first information and the second information to the authentication station in addition to a protocol according to an automatic certificate management environment (ACME).

4. A certificate issuance support method executed by a certificate application device in a first organization for applying to an authentication station for issuance of an OV certificate, and an existence assurance device included in a second organization for guaranteeing the existence of the first organization, the method comprising:
having a processor of the existence assurance device execute
imparting a first electronic signature to first information for guaranteeing the existence of the first organization in response to a request from a terminal used by a member of the first organization,
transmitting the first information to which the first electronic signature is imparted to the certificate application device, and
verifying a second electronic signature, which is generated by the certificate application device and is imparted to second information for guaranteeing affiliation of the member of the first organization in cooperation with the authentication station, and
having a processor of the certificate application device transmit the first information to which the first electronic signature is imparted and the second information to which the second electronic signature is imparted to the authentication station to receive the OV certificate issuance.

5. The certificate issuance support method according to claim 4, wherein the imparting of the first electronic signature includes imparting the first electronic signature to the first information in a case where the member is authenticated.

6. The certificate issuance support method according to claim 4, wherein the processor of the certificate application device executes transmission of the first information and the second information to the authentication station in addition to a protocol according to an automatic certificate management environment (ACME).

7. A non-transitory computer-readable recording medium having computer-readable instructions stored thereon, which when executed, cause a computer to execute operations executed by the processor of the existence assurance device in the certificate issuance support method according to claim 4.

* * * * *